(12) United States Patent
Lindgren et al.

(10) Patent No.: US 11,712,724 B2
(45) Date of Patent: Aug. 1, 2023

(54) DETECTION OF FAULTY COOLING UNITS CONFIGURED TO PROVIDE COOLANT TO ROLLING MILLS

(71) Applicant: ABB Schweiz AG, Baden (CH)

(72) Inventors: Markus Lindgren, Västerås (SE); Christer Sjögren, Kolbäck (SE); Carl-Fredrik Lindberg, Bromma (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/995,808

(22) PCT Filed: Mar. 8, 2021

(86) PCT No.: PCT/EP2021/055786
§ 371 (c)(1),
(2) Date: Oct. 7, 2022

(87) PCT Pub. No.: WO2021/209198
PCT Pub. Date: Oct. 21, 2021

(65) Prior Publication Data
US 2023/0149996 A1    May 18, 2023

(30) Foreign Application Priority Data

Apr. 14, 2020   (EP) ..................................... 20169497

(51) Int. Cl.
*B21B 37/74*     (2006.01)
*B21B 38/02*     (2006.01)
*G01B 21/20*     (2006.01)

(52) U.S. Cl.
CPC .............. *B21B 37/74* (2013.01); *B21B 38/02* (2013.01); *G01B 21/20* (2013.01)

(58) Field of Classification Search
CPC .......... B21B 37/74; B21B 38/02; B01B 21/20
See application file for complete search history.

(56) References Cited

U.S. PATENT DOCUMENTS

| 4,932,232 A | 6/1990 | Ballyns et al. |
| 8,166,785 B2 * | 5/2012 | Ootsuka .................. B21B 37/32 |
| | | 72/224 |

(Continued)

FOREIGN PATENT DOCUMENTS

| CN | 102172642 A | 9/2011 |
| CN | 106694569 A * | 5/2017 |

(Continued)

OTHER PUBLICATIONS

English translation of CN106694569 accessed from iq.ip.com.*

(Continued)

*Primary Examiner* — David Z Huang
*Assistant Examiner* — Jean F Morello
(74) *Attorney, Agent, or Firm* — Whitmyer IP Group LLC (57) ABSTRACT

A method for detecting a faulty cooling unit in a set of cooling units configured to provide a coolant to work rolls arranged to process a work item therebetween, the method including: varying the flow rates of the coolant ejected from a sub-set of the cooling units; in response to varying the flow rates, determining a flatness variation value of the work item for at least each of the cooling units in the sub-set of cooling units, the flatness variation value being indicative of the work item flatness variation downstream of the work rolls; and detecting a faulty cooling unit based on comparing the flatness variation values to a reference flatness variation value.

18 Claims, 7 Drawing Sheets

(56) References Cited

U.S. PATENT DOCUMENTS

2010/0101291 A1    4/2010  Richter et al.
2010/0132426 A1    6/2010  Baumgrtel et al.

FOREIGN PATENT DOCUMENTS

| DE | 3419261 A1 | 11/1985 |
| EP | 3140057 A1 | 3/2017 |
| JP | H01210110 A | 8/1989 |
| JP | 2002120006 A | 4/2002 |
| WO | 9928043 A1 | 6/1999 |

OTHER PUBLICATIONS

Extended European Search Report; Application No. 200057EP; Completed: Sep. 9, 2020; dated Sep. 22, 2020; 8 Pages.
International Search Report and Written Opinion of the International Searching Authority; Application No. PCT/EP2021/055786 ; Completed: May 26, 2021; dated Jun. 8, 2021; 15 Pages.

\* cited by examiner

DETECTION OF FAULTY COOLING UNITS CONFIGURED TO PROVIDE COOLANT TO ROLLING MILLS

TECHNICAL FIELD

The present invention relates to method for detecting a faulty cooling unit in a set of cooling units configured to provide a coolant to work rolls arranged to process a work item therebetween. The invention further relates to a corresponding control unit, to a system, and to a rolling mill.

BACKGROUND

Metal rolling generally relates to producing a metal work piece with reduced and uniform thickness by rolling the metal work piece between two work rolls. In cold rolling the metal work piece is processed at relatively low temperatures, below the crystallization temperature of the metal. Thermal control in cold-rolling mills is important because the temperature difference across the transverse of the work roll affects the flatness of the produced product.

Thermal control may be provided by both heating and cooling systems. Cooling system often include nozzles arranged to spray a cooling fluid onto the work rolls. A malfunctioning nozzle may affect the flatness and thus the quality of the final product.

Traditionally, offline cooling test are performed in order to inspect the cooling system. For this, the nozzles are controlled to spray a cooling liquid on the work rolls, whereby visual inspection of the spray pattern is performed. However, this is both time consuming and requires manual labor.

Accordingly, there is room for improvement with regards to evaluating cooling system operation in rolling mills.

SUMMARY

In view of the above-mentioned and other drawbacks of the prior art, it is an object of the present invention to provide a method for on-line diagnostics of cooling unit operation in rolling mills.

According to a first aspect of the invention, there is provided a method for detecting a faulty cooling unit in a set of cooling units configured to provide a coolant to work rolls arranged to process a work item therebetween, the method comprising: varying the flow rate of the coolant ejected from at least one cooling unit; in response to varying the flow rate, determining a flatness variation value of the work item for at least the at least one cooling unit, the flatness variation value being indicative of the work item flatness variation downstream of the work rolls; and detecting a faulty cooling unit based on comparing the flatness variation values to a reference flatness variation value.

The present invention is at least partly based on the realization that by varying the flow rates of the cooling units, the flatness of the work item will be altered, and that the flatness alteration will be different for a fully functional cooling unit compared to a faulty cooling unit. Thus, the variation in flow rate is used as an excitation on the work rolls and the measured flatness variation is a response of the excitation. Accordingly, a flatness response as caused by the varied flow rate is evaluated for cooling unit diagnostics.

To this end, a flatness variation value is determined. A flatness value is indicative of the flatness of the work item downstream of a cooling unit. The flatness value may be derived from a transversal strain profile of the work item calculated from a measured work item tension profile. Thus, the flatness value may be indicative of a measured stress in the work item. From this transversal strain profile, separate portions may be associated with respective cooling units by spatial correlation. Based on each of the portions may a respective flatness variation value be determined, one for each cooling unit. A flatness variation value may be the difference between two flatness values. Techniques for flatness measurements are known per se including techniques based measuring work item tension profiles.

A flatness variation value indicates the variation in flatness that is caused by varying the flow rate from one level to another level. In other words, if the flatness of the work item is continuously measured it is possible to detect the effect that the variation in flow rate has on the flatness of the work item. Thus, a variation in flatness value in response to varying the flow rate of coolant applied onto the work rolls when the work item is being fed in between the work rolls.

A cooling unit may include various components for spraying a coolant onto the work rolls. A cooling unit may comprise a nozzle and a valve, where the valve opens and closes a supply of coolant to the nozzle. Pressurized coolant flows through the open valve to the nozzle from where the coolant is sprayed onto the work rolls. A fault may occur anywhere in the cooling unit, but most commonly faults occur in the valve or in the nozzle.

A fault in a cooling unit may be caused by many conceivable conditions and may be of different nature. For example, a fault may be a changed spray angle from a nozzle, the width of the spray has changed, a fully or partly blocked nozzle, or a malfunctioning valve, etc.

A variation in flow rate means that the flow rate is varied from one flow rate level to another flow rate level.

A flatness variation value may be the absolute value of the difference between a first flatness value and a second flatness variation value of the work item determined for an associated cooling unit.

Evaluation of the flatness variation values in view of the reference flatness variation value may be performed in various ways. For example, when the flatness variation value for one of the cooling units deviates by more than a threshold value from the reference flatness variation value for the same flow rate variation, an indication may be provided that the respective cooling unit is faulty. A deviation may be the absolute value of the difference between the flatness variation value and the reference flatness variation value.

In one embodiment, the reference flatness variation value may be based on the flatness variation value(s) determined in response to varying the flow rate of at least another one of the cooling units. Accordingly, the evaluation of a faulty cooling unit may be based on comparing flatness variation values to each other. Further, if this is performed for a set of cooling units, a cooling unit with abnormal flatness response, e.g. a flatness variation value that deviates from at least some of the flatness values of the other cooling units, or preferably the median the flatness variation values for all or some of the other cooling units, by more than a threshold value, may be concluded to be a faulty cooling unit. This advantageously provides for improved automation of the faulty cooling unit detection, that at least does not require extensive prior reference measurements.

In embodiments, the reference flatness variation value is based on a statistical value determined based on a set of flatness variation values determined in response to varying the flow rates of a plurality of the set of the cooling units. Preferably, the reference flatness variation value may be the median of the flatness variation values for all or some of the cooling units in the set of cooling units. This provides for a more accurate determination of whether a cooling unit is faulty.

In some embodiments, the flow rates for a sub-set of cooling units are maintained constant. For example, each cooling unit in the sub-set of cooling units has closest neighboring cooling units which flow rates are maintained substantially constant when the flow rates of the at least one cooling unit is/are varied. This advantageously provides for detecting deviating spray angles or sprays widths for the cooling units. Thus, it is possible to determine if a cooling unit is spraying coolant on a neighboring zone of the work roll where it shouldn't be spraying coolant. That the flow rates are substantially constant should be interpreted broadly that a small variation in the flow rates may be allowed but that such variation should be small enough to not significantly affect the flatness variation measurement.

In embodiments, the at least one cooling unit may comprise cooling units that are interspaced with cooling units which flowrates' are maintained substantially constant when the flow rates of the at least one cooling unit are varied. In possible implementations, the flowrates of e.g. every second, every third, every forth, or every fifth cooling unit is varied.

In some embodiments, when the flow rates of at least one cooling unit is increased, the flow rates of at least one other cooling unit is decreased. This advantageously provides for maintaining the total flow of coolant constant.

In embodiments, a time duration between consecutive flow rate variations may be longer than a predetermined time duration. The predetermined time duration is advantageously long enough for the cooling effect on the work roll caused by the varied flow rates is detectable and at least partly settled in the flatness measurements. Thus, the cooling effect on the flatness of the work item may be somewhat delayed and once the effect occurs the flatness of the work item drifts for a time. Therefore, the flow rate is maintained constant for at least the predetermined time duration after the flow rate has been varied from one level to another level. This allows for most of the flatness change to have occurred before the flatness is measured.

Further, the time durations between flow rate variations, are preferably equal for each consecutive flow rate variations. In other words, consecutive time durations are equal. Further, the time duration is equal for each of the cooling units.

The flatness may be measured in various conceivable ways and with various devices. One such device is generally known as a shape meter which measures the transverse shape of the work item and based on this an indication of the flatness of the work item may be derived. Further, a so-called stressometer may be used for performing flatness measurements. As is known to the skilled person, a stressometer measures the transverse distribution of stress e.g. in terms of $N/mm^2$, in the work item, and based on this an indication of the flatness of the work item may be derived.

In some embodiments, the flatness variation values may be determined for cooling units for which the flow rates are maintained substantially constant. The allows for detecting fault related to a cooling unit spraying when it shouldn't, or that neighboring cooling units are spraying in the wrong zones not associated with the cooling unit.

The work item may preferably be a metal strip.

According to a second aspect of the invention, there is provided a control unit configured to detect a faulty cooling unit in a set of cooling units configured to provide a coolant to work rolls arranged to process a work item therebetween, the control unit is configured to: in response to flow rates being varied of the coolant ejected from at least one of the cooling units, acquire flatness data indicating a flatness variation value of the work item for each of the at least one of the cooling units, the flatness variation value being indicative of the work item flatness variation downstream of the work rolls; and detect a faulty cooling unit based on comparing the flatness variation values to a reference flatness variation value.

The control unit may be configured to: control a valve for varying the flow rates of coolant provided to a nozzle of the at least one cooling unit. Thus, the control unit may be communicatively connected to control circuitry or a control mechanism of the valve such that the control unit may send control signals to the valve to cause the flow rates to vary.

A magnitude of the flow rate variation may for example depend on the material of the metal strip and on a temperature difference between the coolant and the work roll. The flow rate variation should be large enough such that a sufficiently large flatness variation is caused and that is detectable. As an example, the flow rate variation may be between 0% and 100% flow rate, or between 10% and 100%, or between 10% and 90% flow rate, between 20% and 80% flow rate, between 30% and 70% flow rate. However, other possible flow rate variations are conceivable as long as a flatness response is detectable.

Further effects and features of the second aspect of the invention are largely analogous to those described above in connection with the first aspect of the invention.

According to a third aspect of the invention, there is provided a system for detecting a faulty cooling unit in a set of cooling units configured to provide a coolant to work rolls arranged to process a work item therebetween, the system comprising: a sensing arrangement for measuring a flatness value of the work item downstream of the work rolls, and a control unit configured to: receive flatness data from the sensing arrangement indicative of the flatness measured in response to the varied flow rates, determine a flatness variation value of the work item for each of the at least one cooling unit based on the flatness data, the flatness variation value being indicative of the work item flatness variation downstream of the work rolls; and compare the flatness variation values to a reference flatness variation value, for detecting a faulty cooling unit.

Further effects and features of the third aspect of the invention are largely analogous to those described above in connection with the first aspect and the second aspect of the invention.

There is further provided a rolling mill comprising at least two working rolls configured to process a work item therebetween, and a system according to embodiments of the third aspect of the invention.

The rolling mill may be a cold rolling mill.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention.

Figure 1A:
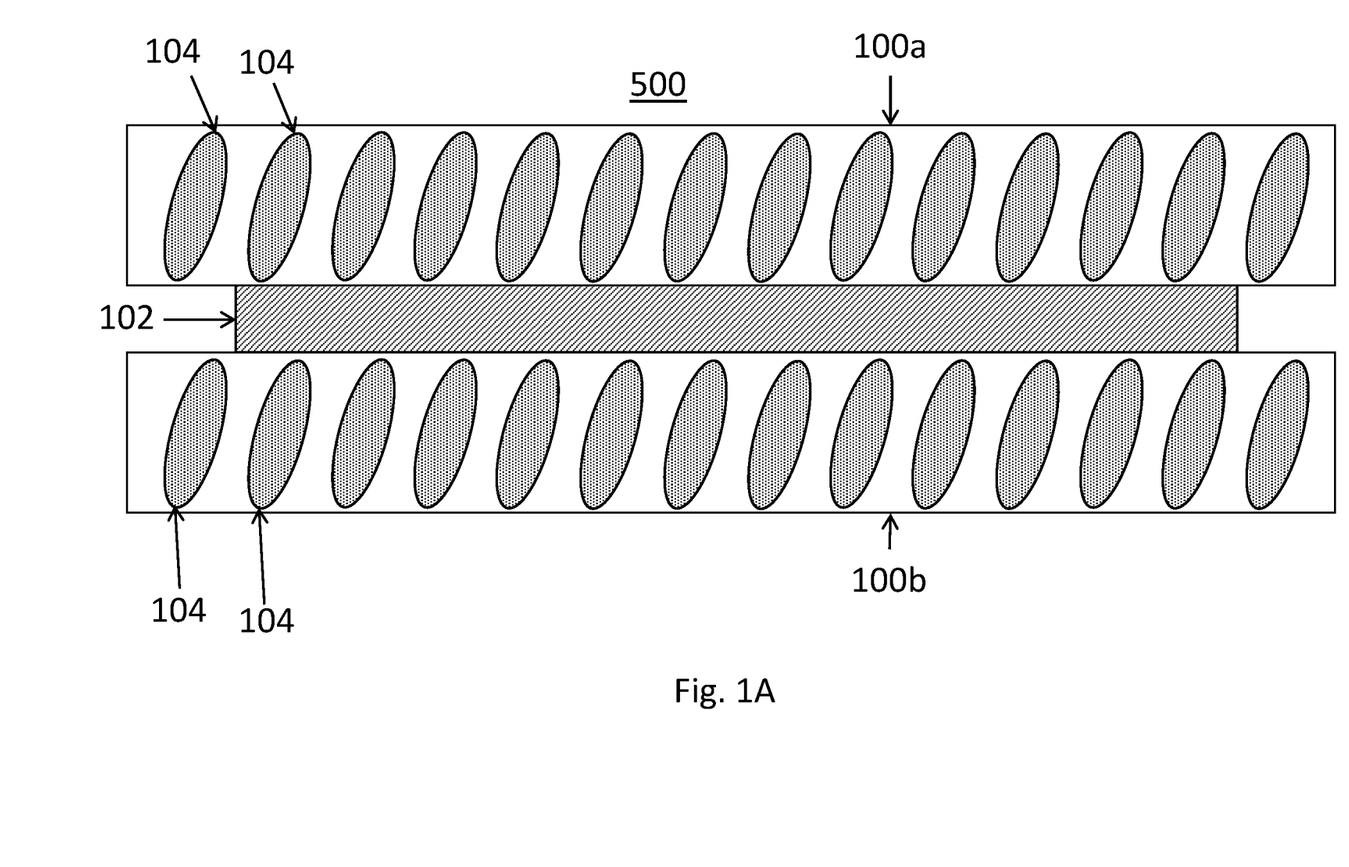
FIG. 1A conceptually illustrates work rolls processing a work item, and spray patterns of coolant on the work rolls according to an embodiment of the invention.

FIG. 1A conceptually illustrates work rolls 100a and 100b arranged to process a work item 102 therebetween. The work rolls 100a and 100b may be comprised in a rolling mill process plant 500, such as a cold rolling mill, configured to process work items in the form of a metal strip 102.

During processing of the metal strips, as is known in the art, the flatness of the final product depends to some degree on the temperature variations across the width of the work rolls 100a and 100b. It is therefore of importance to have efficient thermal control of the work rolls 100a-b. Cooling of the work rolls 100a-b is provided by applying a coolant to each the work rolls 100a-b through cooling units arranged near the work rolls 100a-b. In FIG. 1A, the spray patterns or zones 104 of individual cooling units are conceptually illustrated. Note that not all the spray patterns or zones are numbered.

Figure 1B:
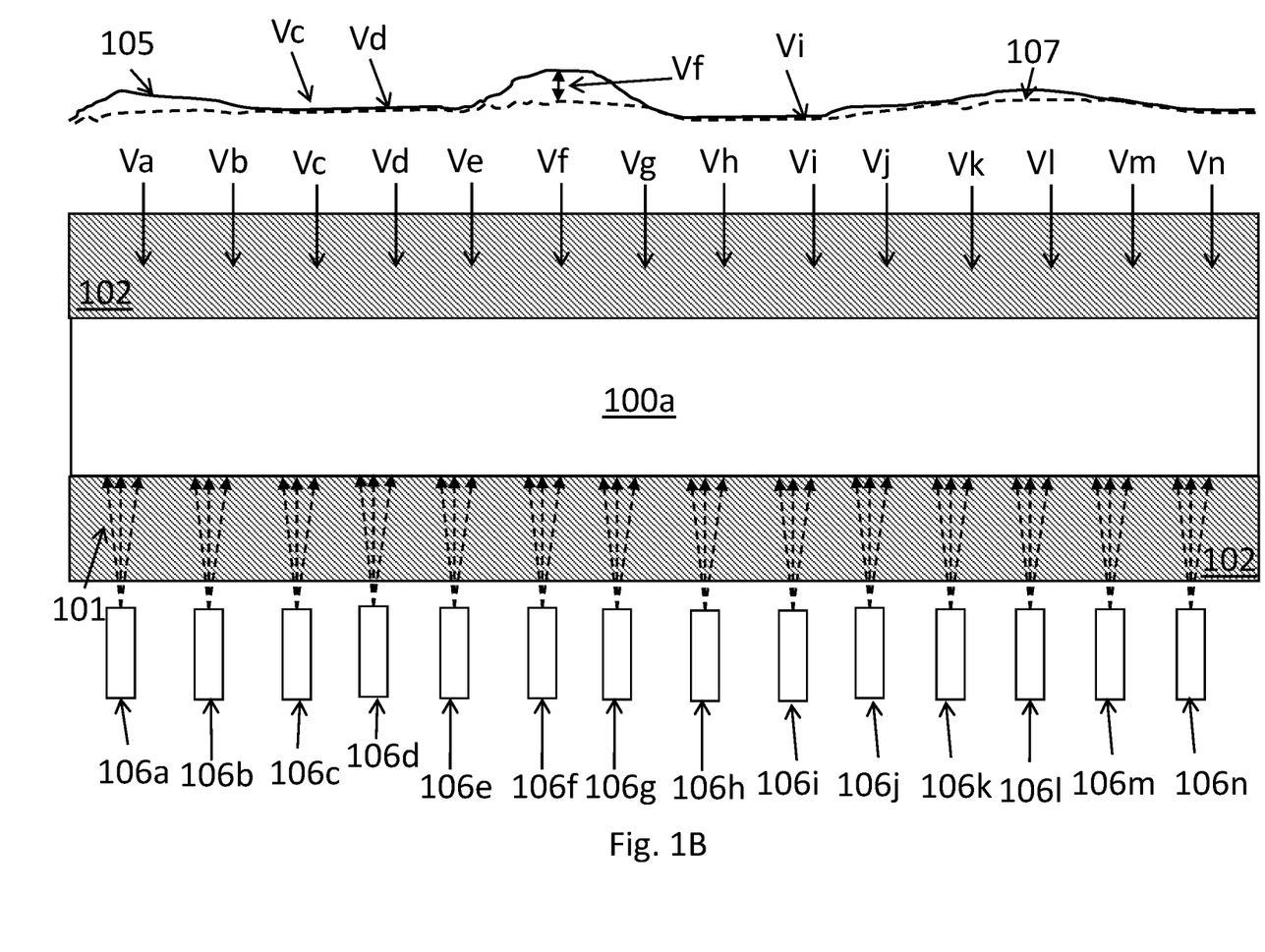
FIG. 1B is a conceptual view of a set of cooling units applying coolant to a work roll.

FIG. 1B conceptually illustrates a top view of a set of cooling units 106a-n that are arranged to provide a coolant 101 to the work roll 100a. The flow rates from the cooling units are individually controllable for varying the flow rate of coolant provided from each of the cooling units 106a-n to the work roll 100a.

FIG. 1B conceptually illustrates a flatness profile 105 representing the flatness, e.g. a conceptual tension profile" of the work item 102 downstream of the work rolls 100a-b. A set of flatness variation values Va-Vn, may be determined from the flatness profile 105. Here, the flatness variation value Vf is illustrated as a difference between a flatness value of the flatness profile 105 and a flatness value from a prior determined flatness reference profile 107. Thus, the flatness profiles 107 and 105 are the profiles across the width of the work item 102 at two difference time instances, before the flow rate is varied or at least before the effect of the varied flow rate is detected, flatness profile 107 and in response to the varied flowrate, flatness profile 105. The flatness profile of the work item 102 may be continuously monitored, whereby a flatness variation may be determined from comparing flatness profiles to each other. Note that the "flatness profile" may refer to a transversal strain profile that is indicative of a flatness profile of the work item.

Figure 1C:
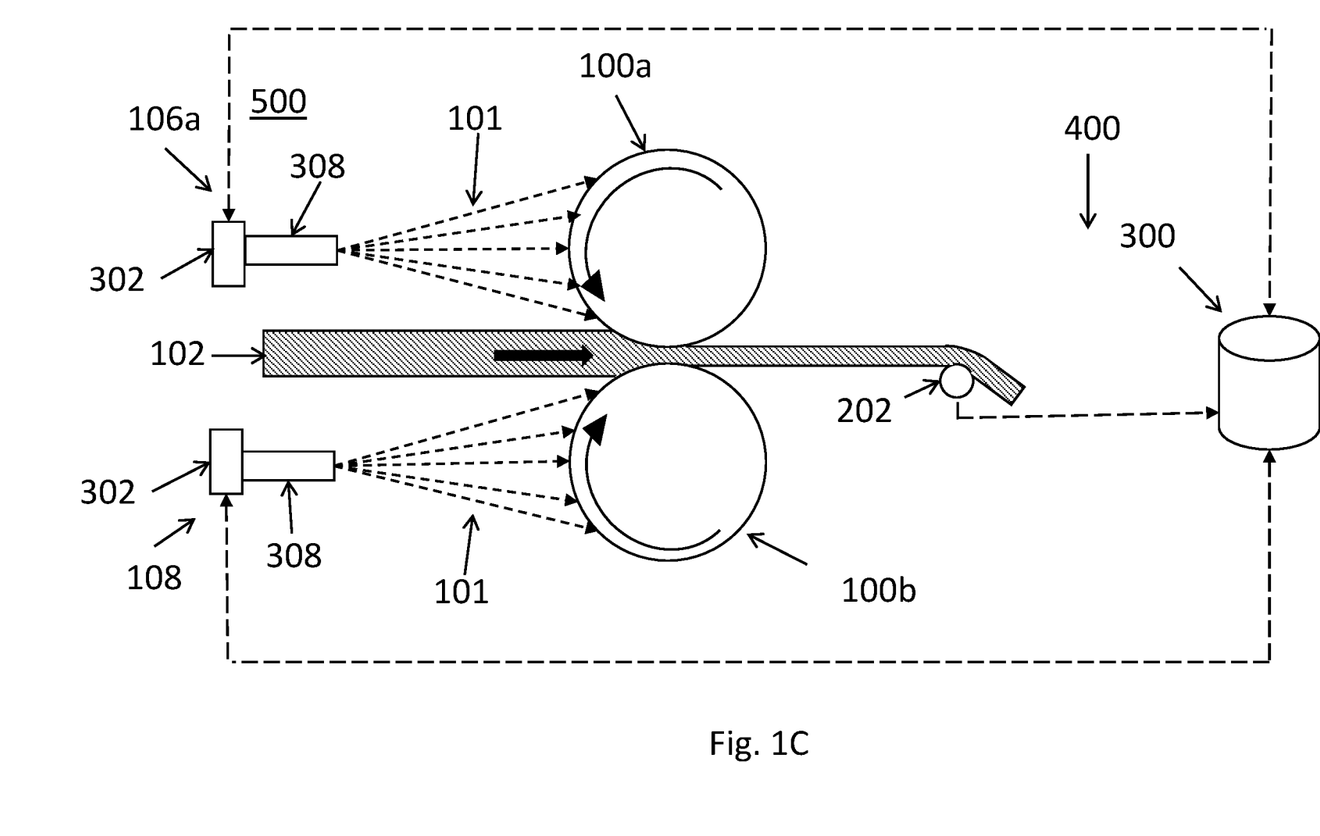
FIG. 1C is a side view of the work rolls in FIG. 1A, and a conceptual illustration of a system according to an embodiment of the invention.

FIG. 1C is a side view of the work rolls 100a-b processing the work item 102. The work item 102 is fed in between the rotating work rolls 100a-b, whereby the separation between the work rolls 100a-b provides for reducing the thickness and flattening of the work item 102 between the work rolls 100a-b. Cooling units 106a and 108 are arranged to provide a spray of coolant 101 to a respective work roll 100a, and 100b. Each cooling unit comprises a valve 302 and a nozzle 308. It is understood that the components shown in FIG. 1C are not to scale, but is a conceptual drawing shown for understanding of embodiments presented herein.

As mentioned above, the coolant is used for thermal control of the work rolls 100a-b. The temperature variation across the transverse of the work rolls 100a-b will affect the flatness of the work item downstream of the work rolls 100a-b, e.g. at the location of the sensing arrangement 202 configured to measure the flatness of the work item 102. Such as sensing arrangement may be provided as a shape meter, for example a so-called "stressometer", which may be configured to measure pressure changes against a roll caused by deviating flatness of the work item. Shape meters are generally known per se.

Figure 1D:
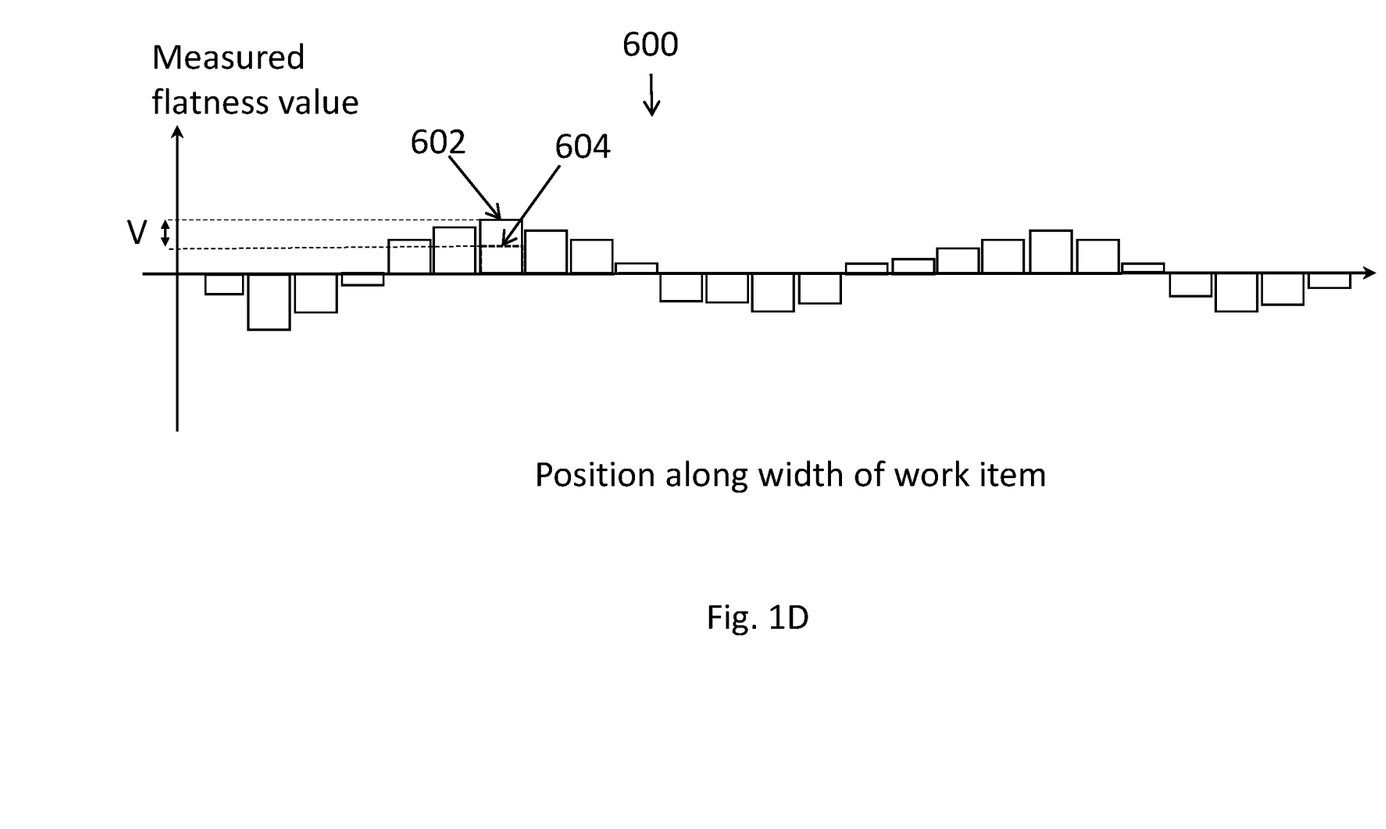
FIG. 1D is a diagram conceptually exemplifying a flatness measurement.

FIG. 1D conceptually illustrates a flatness measurement of a work item. The measurement provides a set of flatness values, each represented by a bar in the diagram 600 where one bar is numbered 602. A flatness variation value is the variation in height of a bar in response to varying the flow rate of coolant. For example, in response to varying the flow rate from one level to another level from one cooling unit, the height of bar 602, i.e. the flatness value represented by the bar 602, may change to a second flatness value represented by the second bar 604 show as a dashed line. The difference between the two flatness values is the flatness variation value V.

Figure 1E:
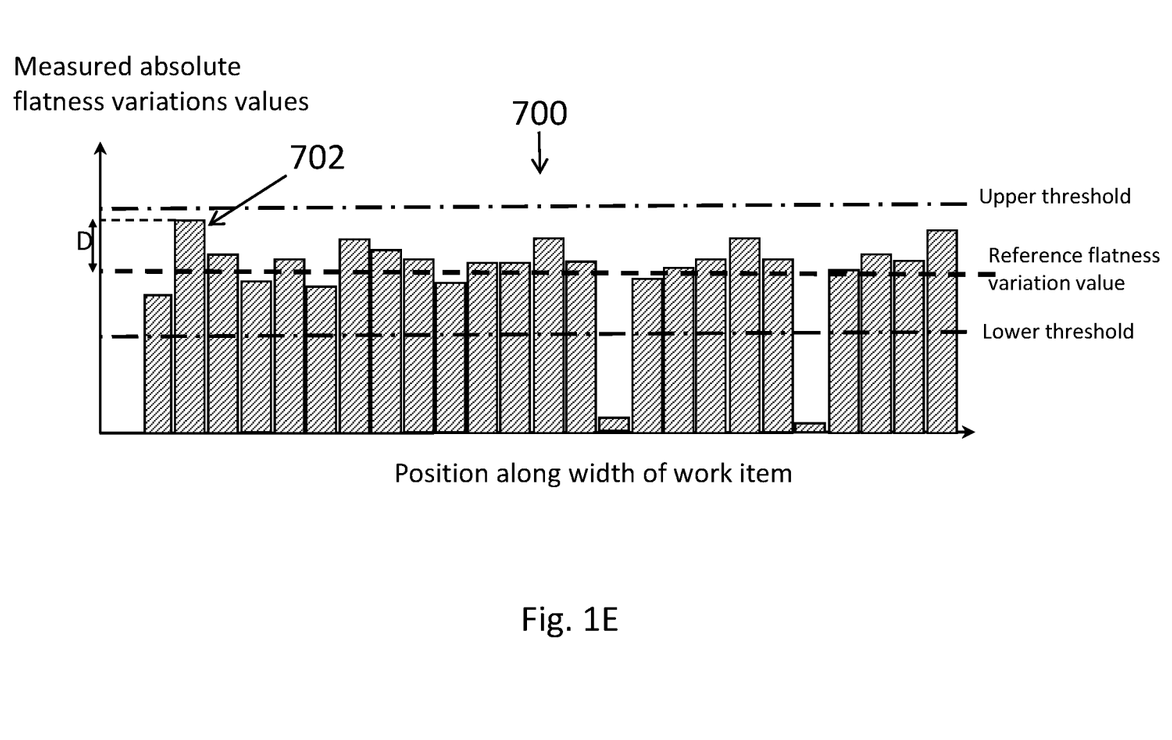
FIG. 1E is a diagram conceptually exemplifying absolute flatness variation values.

FIG. 1E is a diagram 700 of measured absolute flatness variation values, of which one is denoted 702, for flow rate variation in each cooling unit versus position along width of the work item. The diagram 700 illustrates a reference flatness variation value, which is preferred embodiments is the median of the absolute flatness variation values. The diagram 700 further conceptually illustrates two different threshold levels that are applicable for embodiments described herein. An upper threshold and a lower threshold. Thus, if an absolute flatness variation value exceeds the upper threshold, or if an absolute flatness variation value is below the lower threshold, the corresponding cooling unit may be concluded to be faulty.

FIG. 1E exemplifies a deviation D between an absolute flatness variation value 702 and the reference flatness variation value. If this deviation D is larger than a threshold value given by the difference between the reference flatness variation value and e.g. the upper threshold level, the corresponding cooling unit may be concluded to be faulty. Note that the difference between the reference flatness variation value and the upper threshold may be different from the difference between the reference flatness variation value and the lower threshold. Thus, there may be an upper and a lower threshold value, used depending on if the absolute flatness variation value is larger or smaller than the reference flatness variation value.

Figure 2:
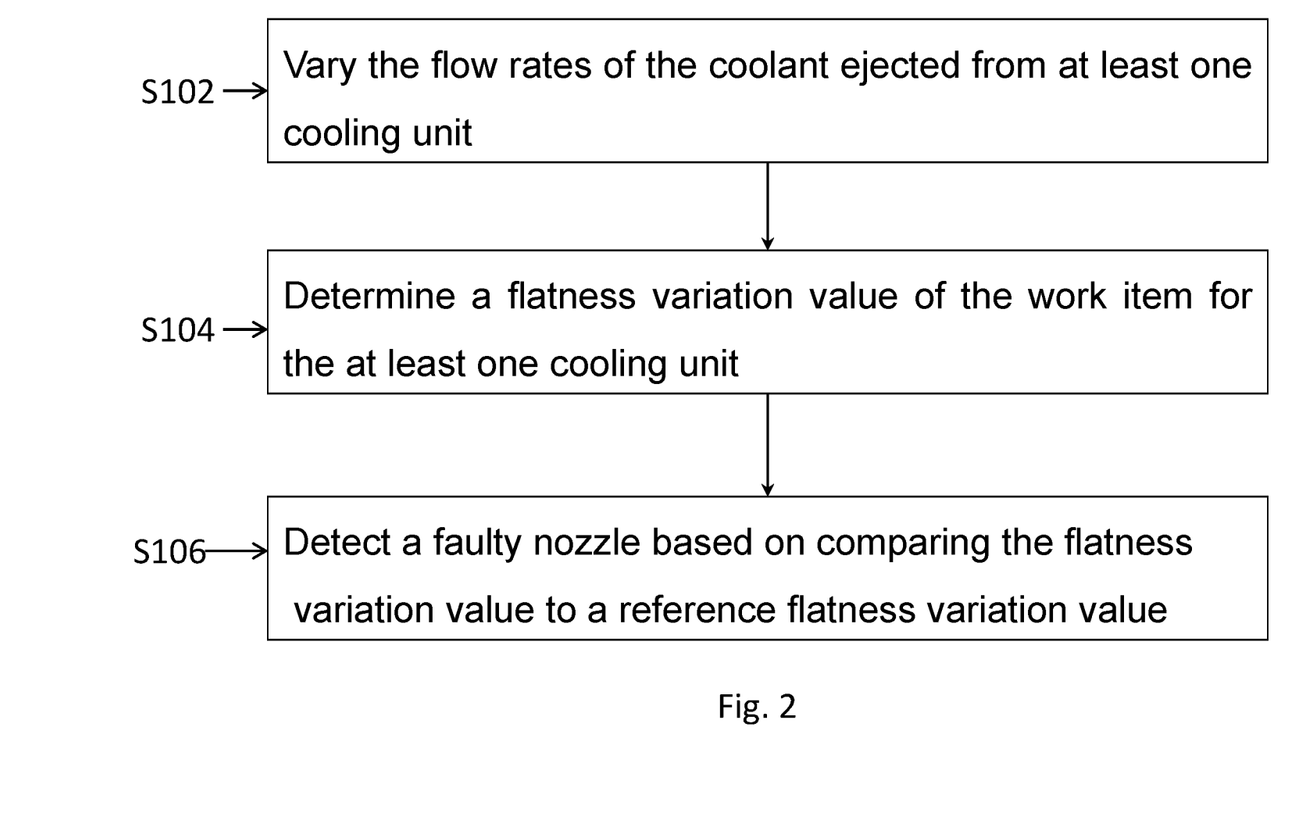
FIG. 2 is a flow-chart of method steps according to embodiments of the invention.

FIG. 2 is a flow-chart of method steps according to embodiments of the invention. The method steps in FIG. 2 will be described in conjunction with FIGS. 1A-D.

The method is for detecting a faulty cooling unit in a set of cooling units 106 configured to provide a coolant to work rolls 100*a-b* arranged to process a work item 102 therebetween.

In step S102 of the method, varying the flow rates of the coolant ejected from at least one 106*f* of the cooling units 106*a-n*. In response to varying the flow rate(s), determining, in step S104, a flatness variation value Vf, see also V in FIG. 1D, of the work item 102 for each of the at least one cooling units. The flatness variation value is indicative of the work item 102 flatness variation downstream of the work rolls 100*a-b*. The flatness is determined by a sensing arrangement 202 downstream of the work rolls 100*a-b*.

In step S106, detecting a faulty cooling unit based on comparing the flatness variation value(s) Vf to a reference flatness variation value.

In one possible implementation, when the flatness variation value for one of the cooling units deviates by more than a threshold value from the reference flatness variation value, providing an indication the respective cooling unit is faulty.

For example, if the flatness variation value Vf exceeds the reference flatness variation value more than acceptable, i.e. more than a threshold value, it may be concluded that the cooling unit 106*f* is a faulty cooling unit.

As mentioned above in relation to FIG. 1B, the flatness variation value reflects a variation of the flatness of the work item. The flatness variation value is the difference between flatness values determined at different times as the work item is being fed in between the work item. Thus, the flatness values being used for determining the flatness variation value reflects the flatness at two different times and therefore locations on the work item. At least one of the flatness values may be determined in response to the varying flow rate while the work item is processed. The difference between the flatness values may be the absolute value of the difference. In other words, the flatness variation value determined for a cooling unit is based on the evolution of the flatness in response to varying the flow rate. Turning to FIG. 1C and FIG. 1D, as the work item is fed through the work rolls 100*a-b*, the sensing arrangement 202 continuously measures the flatness of the work item 102. Thus, a flatness value 602 may be obtained before the flow rate is varied from one level to another level or at least before the effect of the varied flow rate occurs in the work item, and this flatness value may be compared to a flatness value 604 obtained after the flow rate is varied at a time when the cooling effect on the flatness has occurred, see also discussion with reference to FIG. 3. The difference between the flatness values reflects the flatness response as caused by the flow rate variation.

The reference flatness variation value may be based on the flatness variation value determined in response to varying the flow rate of at least another one of the cooling units. In other possible implementations, the reference flatness variation value may be based on statistical value determined based on a set of flatness variation values determined in response to varying the flow rates of a plurality of the set of the cooling units. Preferably, the reference flatness variation value may be a median of the flatness variation values for the cooling units 106*a-n*. With further reference to FIG. 1D, a flatness variation value V is determined for each of the flatness values, e.g. each bar position shown in the diagram. A flatness variation value is determined for each of the cooling units, in other words, each bar 602 in the diagram 600 may be associated with a respective cooling unit. Subsequently, the median of all the flatness variation values is determined and used as a reference flatness variation value. If a flatness variation values deviates too much, i.e. more than the threshold value, from the median of the flatness variation values, then the respective cooling unit is concluded to be faulty. Other statistical values may be applied such as, standard deviations e.g. determining if a flatness variation value is within a predetermined number of standard deviations to the reference flatness value, percentiles, etc.

For example, now turning to FIG. 1B, if the median of the flatness variation values Va-Vn, or the median of the flatness variation values for at least a sub-set of the cooling units, e.g. the flatness variation values Vb-Vm, then the flatness variation value Vf will deviate significantly from the median of the flatness variation values Va-Vn, and if only a sub-set is considered, the median of the subset Vb-Vm. In other words, the flatness variation value Vf may be considered abnormal in relation to the other flatness variation values, whereby the cooling unit 106*f* may be concluded to be faulty. Preferably, the median of all the flatness variation values is used, however, subsets of flatness variation values may be conceivable to use. In case of a subset, the end values for the edges of the work item, e.g. Va and Vn may be considered a subset.

Generally, a time duration between consecutive flow rate variations is longer than a predetermined time duration. For example, a first flow rate variation is performed to a first flow rate level which is maintained for a time duration being equal to the predetermined time duration. In this way, the effect on the flatness caused by the varied flow rate can occur and be detectable in the flatness measurement. After the measurement, the flow rate may be varied to a second flow rate level, and so on.

Figure 3:
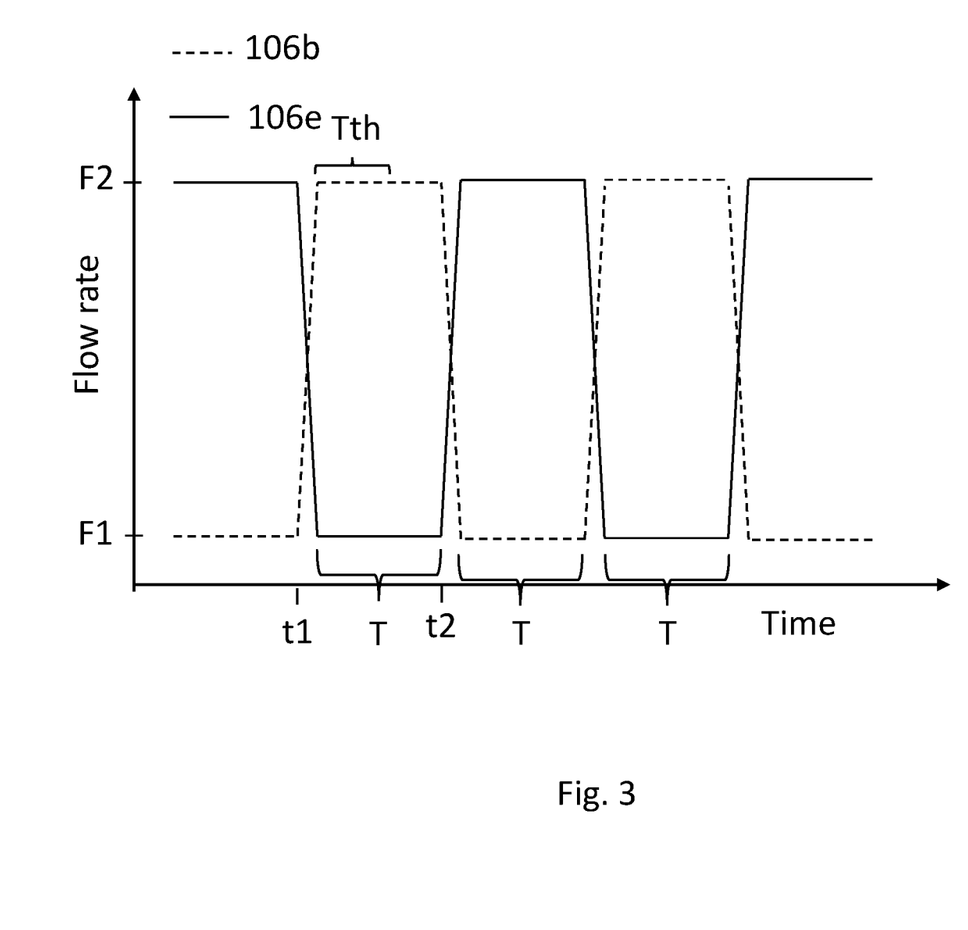
FIG. 3 is a graph illustrating oppositely varying cooling unit flow rates according to embodiments of the invention.

FIG. 3 is a graph schematically describing a flow rate variation scheme according to embodiments of the invention. The y-axis represents the flow rate, and the x-axis represents time. In the graph, the dashed line represents the coolant flow rate versus time for a first cooling unit 106*b* and the solid line represents the coolant flow rate versus time for a second cooling unit 106*e* indicated in FIG. 1B. The dashed line may also represent a first sub-set of cooling units, and the solid line may equally well represent a second sub-set of cooling units. Thus, the flow-rate for sub-sets of cooling units may be varied according to the scheme in FIG. 3.

FIG. 3 illustrates that the flow rates for two cooling units, 106*b* and 106*e*, are varied, and that when the flow rates of a first cooling unit 106*b* is increased, the flow rate of the second cooling unit 106*e* is decreased, and vice versa. For example, at time t1, the flow rate of the first cooling unit 106*b* is increased from F1 to F2, whereas at the same time the flow rate for the second cooling unit 106*e* is decreased from F2 to F1. At time t2, the flow rate of the first cooling unit 106*b* is decreased from F2 to F1, whereas at the same time the flow rate for the second cooling unit 106*e* is increased from F1 to F2.

A time duration T for maintaining the flow rates, before switching to another flow rate lapses from t1 and t2 for allowing the effect of the flow rate variations on the flatness of the work item to occur and be measurable. The flatness is measured before the end of the time duration, but after a predetermined time duration Tth has lapsed to ensure that the flatness effects are measurable.

The time duration T, that the flow rates are maintained constant, i.e. the time durations between flow rate variations, are preferably equal for each consecutive flow rate variation, in other words consecutive time durations are equal. Further, the time durations for each of the cooling units are preferably equal. As illustrated in FIG. 3, the time duration T is the same for consecutive time durations between flow rate variations. Further, it is preferred that the flatness measurements used for determining the flatness variation values are performed after equal times have lapsed from the corresponding flow rate variation, for example at the predetermined time duration, Tth.

Varying the flow rate in opposite directions for two cooling units, or two sub-sets of cooling units advantageously maintains the total flow of coolant closer to constant than if the flow rate for all the cooling units were varied equally. This provides for better overall cooling during cooling unit testing.

To improve the ability to detect overlapping coolant spray flows it is advantageous to leave at least one or two cooling units unchanged between the varying flow rate cooling units.

In other words, in order to further improve the ability to detect the effects of overlapping spray flows, the flow rate for a sub-set of cooling units are maintained constant when the flow rates of selected cooling units are varied. For example, the flow rates for the cooling units 106c-d arranged between the cooling units 106b and 106e may be maintained substantially constant.

In advantageous embodiments, each of the at least one cooling unit has closest neighboring cooling units, e.g. cooling units 106c-d mentioned above which flow rates are maintained constant are closest neighbors to the respective cooling units 106b and 106e which flow rates are varied.

The at least one cooling unit 106a-n may comprise cooling units that are interspaced with cooling units, e.g. cooling unit 106c-d which flowrates are maintained substantially constant when the flow rates of the at least one cooling unit is/are varied.

In embodiments, the flatness variation values may be determined for cooling units for which the flow rates are maintained constant. Thus, flatness variation values may be determined even for cooling units which flow rates are not varied in a present flow-rate variation. This improves the ability to detect cooling units spraying coolant when they shouldn't, or to detect spray zones receiving coolant when they should not be receiving coolant which may indicate that a neighboring cooling unit is faulty.

The total number of cooling units or the number of cooling units in the sub-sets are here only shown for example purposes and may include any number of cooling units depending on the specific rolling mill setup at hand. For example, a rolling mill may comprise 10, 15, 20, 25, 30, 35, 40, 50, 60, or any other number of cooling units.

The number of cooling units in a sub-set for which the flow rates are varied may be any sub-set of the cooling units arranged to provide coolant to the work roll. The sub-set may even be a single cooling unit, although the preferred embodiment includes to have every third cooling unit in a sub-set. In other words, the flow rates for cooling units 106c, 106f, 106i, and 106l may be varied simultaneously for determining flatness variation values. The flow rates for the remaining cooling units may be maintained substantially constant. Once the flatness variation values for cooling units 106c, 106f, 106i, and 106l have been determined, the flow rates for a set of the remaining cooling units are varied, and so on until a flatness variation values for all cooling units have been determined.

Turning to FIG. 1C again. In one implementation, a control unit 300 is configured to detect a faulty cooling unit in a set of cooling units. As described above, the cooling units 106a-n, 108 being configured to provide a coolant to work rolls 100a-b arranged to process a work item 102.

The control unit 300 is configured to, in response to flow rates of the coolant ejected from at least one of the cooling units 106a-n being varied, acquire flatness data indicating a flatness variation value of the work item 102 for each of the at least one cooling units. The flatness variation value being indicative of the work item flatness variation downstream of the work rolls. In other words, the control unit 300 is in communication with the sensing arrangement 202 for receiving flatness data from the sensing arrangement 202. The flatness data may include the flatness variation value itself, or the control unit 300 processes the flatness data to compute the flatness variation value.

The control unit 300 is configured to detect a faulty cooling unit based on comparing the flatness variation values to a reference flatness variation value, in ways described above.

The control unit 300 may be connected to a valve 302 which controls the flow rate for the cooling units. The control unit 300 may receive a control signal from the valve 302 that the flow rates are being varied, whereby the control unit acquires flatness data, after the predetermined time duration threshold Tth has lapsed.

In other possible implementations, the control unit 300 initiates the flatness measurement procedure for detecting a faulty cooling unit. For this, the control unit controls the valve 302 to vary the flow rate of coolant provided to a nozzle 308 of the respective cooling units 106a-n. Accordingly, the control unit 300 transmits control signals to the valve 302 for instructing it to open or close to vary the flow rates for the cooling units.

The valve 302 is configured to control the flow of pressurized coolant from a reservoir to the nozzles by means.

Turning again to FIG. 1A-C, and in particular FIG. 1C, there is further provided a system 400 for detecting a faulty cooling unit in a set of cooling units configured to provide a coolant to work rolls arranged to process a work item therebetween. The system comprises a sensing arrangement 202 for measuring a flatness value of the work item 102 downstream being processed by the work rolls. The system further comprises the control unit 300 configured to: receive flatness data from the sensing arrangement 202 indicative of the flatness measured in response to the varied flow rates, determine a flatness variation value of the work item for each of at least one cooling unit based on the flatness data, the flatness variation value being indicative of the work item flatness variation downstream of the work rolls 100a-b; and compare the flatness variation values to a reference flatness variation value for detecting a faulty cooling unit.

The system may comprise at least one valve 302 configured to control the flow of coolant from a coolant reservoir to the cooling units.

It should be noted that the drawings are not to scale and provide conceptually illustrations of the embodiments.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for detecting a faulty cooling unit in a set of cooling units, configured to provide a coolant to work rolls arranged to process a work item therebetween, the method comprising:
varying flow rates of the coolant ejected from at least one of the cooling units;
in response to varying the flow rates, determining a flatness variation value of the work item for at least the at least one cooling unit, the flatness variation value being indicative of the work item flatness variation downstream of the work rolls; and
detecting a faulty cooling unit based on comparing the flatness variation value(s) to a reference flatness variation value.

2. The method according to claim 1, wherein when the flatness variation value for one of the cooling units deviates by more than a threshold value from the reference flatness variation value, providing an indication the respective cooling unit is faulty.

3. The method according to claim 2, wherein the flatness variation value is the difference between flatness values determined at different times.

4. The method according to claim 2, wherein the reference flatness variation value is based on the flatness variation value(s) determined in response to varying the flow rate of at least another one of the cooling units.

5. The method according to claim 2, wherein the reference flatness variation value is based on a statistical value determined based on a set of flatness variation values determined in response to varying the flow rates of a plurality of the set of the cooling units.

6. The method according to claim 2, wherein the flow rates for a sub-set of cooling units are maintained substantially constant.

7. The method according to claim 1, wherein the flatness variation value is the difference between flatness values determined at different times.

8. The method according to claim 1, wherein the reference flatness variation value is based on the flatness variation value(s) determined in response to varying the flow rate of at least another one of the cooling units.

9. The method according to claim 1, wherein the reference flatness variation value is based on a statistical value determined based on a set of flatness variation values determined in response to varying the flow rates of a plurality of the set of the cooling units.

10. The method according to claim 1, wherein the flow rates for a sub-set of cooling units are maintained substantially constant.

11. The method according to claim 1, wherein each of the at least one cooling unit has closest neighboring cooling units which flow rates are maintained substantially constant when the flow rates of the at least one cooling unit is/are varied.

12. The method according to claim 1, wherein the at least one cooling units comprises cooling units that are interspaced with cooling units which flowrates are maintained substantially constant when the flow rates of the at least one cooling unit are varied.

13. The method according to claim 1, wherein a time duration between consecutive flow rate variations is longer than a predetermined time duration.

14. The method according to claim 1, wherein the flatness variation values are determined for cooling units for which the flow rates are maintained constant.

15. The method according to claim 1, wherein the at least one cooling unit comprises every second cooling unit, every third cooling unit, every fourth cooling unit, or every fifth cooling unit of the set of cooling units.

16. A system for detecting a faulty cooling unit in a set of cooling units configured to provide a coolant to work rolls arranged to process a work item therebetween, the system comprising:
a sensing arrangement for measuring a flatness value of the work item downstream of the work rolls, and a control unit configured to:
receive flatness data from the sensing arrangement indicative of the flatness measured in response to varied flow rates of coolant, determine a flatness variation value of the work item for each of at least one cooling unit based on the flatness data, the flatness variation value being indicative of the work item flatness variation downstream of the work rolls; and
compare the flatness variation values to a reference flatness variation value for detecting a faulty cooling unit.

17. The system according to claim 16, the control unit being configured to control a valve for varying the flow rates of coolant provided to the at least one cooling unit.

18. A rolling mill comprising:
at least two working rolls configured to process a work item therebetween; and
a faulty cooling unit detection system having a sensing arrangement for measuring a flatness value of the work item downstream of the work rolls, and
a control unit configured to:
receive flatness data from the sensing arrangement indicative of the flatness measured in response to varied flow rates of coolant,
determine a flatness variation value of the work item for each of at least one cooling unit based on the flatness data, the flatness variation value being indicative of the work item flatness variation downstream of the work rolls, and
compare the flatness variation values to a refernce flatness variation value for detecting a faulty cooling unit.

* * * * *